United States Patent [19]

Sakurai

[11] Patent Number: 5,170,161
[45] Date of Patent: Dec. 8, 1992

[54] WIRELESS TRANSMITTING-RECEIVING APPARATUS FOR A BICYCLE

[75] Inventor: Nobuo Sakurai, Itami, Japan

[73] Assignee: Cat Eye Co., Ltd., Osaka, Japan

[21] Appl. No.: 476,781

[22] Filed: Feb. 8, 1990

[30] Foreign Application Priority Data

Jun. 10, 1989 [JP] Japan .................................. 1-147110

[51] Int. Cl.⁵ .......................................... G08C 19/16
[52] U.S. Cl. ............................ 340/870.3; 340/870.19;
340/870.28; 340/825.6; 340/825.61
[58] Field of Search ............ 340/870.3, 870.19, 870.2,
340/825.6, 825.61, 825.62, 870.24, 870.28, 432,
670; 341/178, 184, 185, 189; 375/21, 23, 40,
117; 377/24.1, 24.2; 329/313, 336; 307/273,
602; 328/191, 193, 207

[56] References Cited

U.S. PATENT DOCUMENTS 2,698,896  1/1955  Rinia ..................................... 375/23
3,257,651  6/1966  Feisel ............................... 340/870.14
4,007,419  2/1977  Jasmine .............................. 377/24.1

Primary Examiner—Donald J. Yusko
Assistant Examiner—Michael Horabik
Attorney, Agent, or Firm—Allegretti & Witcoff, Ltd.

[57] ABSTRACT

A wireless transmitting-receiving apparatus for detecting and displaying the speed of travel of a bicycle which is mounted on a wheel, including a sensor generating one signal per every rotation of the wheel, a signal receiving apparatus for successively receiving signals generated from the sensor, a pulse signal generator generating at least two pulse signals with a prescribed pulse interval for every generated signal, a wireless transmitter for transmitting continuously the generated pulse signals, a receiver for successively receiving the transmitted pulse signals, a converter for converting the received pulse signals into signals corresponding to the inputted signals based on the prescribed pulse interval, a microcomputer for calculating the speed of travel of the bicycle, distance traveled, and other similar functions of the bicycle, and a displaying portion for displaying the calculated speed of travel and other data.

10 Claims, 5 Drawing Sheets

WIRELESS TRANSMITTING-RECEIVING APPARATUS FOR A BICYCLE

BACKGROUND OF THE INVENTION

The present invention relates to a transmitting-receiving apparatus and, more specifically to a wireless transmitting-receiving apparatus suitable for use in a speedometer of a bicycle and the like.

Currently, a speedometer is often attached to two-wheeled vehicles and, especially on bicycles so as to show, in a simple manner, the speed of travel, the distance of travel and the like information. In a known speedometer, a rotation sensor is attached to a fork, the body of the speedometer is attached to the handlebar by means of a bracket, and the sensor and the bracket are connected to each other by a cord, as shown, for example, in Japanese Patent Laying Open No. 57-149967. Signals generated based on the rotation of the front wheel of the bicycle are inputted to the speedometer through the cord, and the speed of travel of the bicycle is calculated and displayed based on the signals.

The cord of a speedometer as described above can be broken or damaged by the vibration during travel, as the cord is arranged along the fork. In addition, the appearance of such cord is not very desirable. In order to eliminate such disadvantages of the speedometer having such cords, wireless transmission of the rotational signal instead of the use of cords has been proposed. However, it is impossible to use a wide space to mount a power supply on a bicycle. Therefore, in order to employ a wireless speedometer for a bicycle, the signals must be transmitted by a transmission unit of low power consumption and the signals must be received by a highly sensitive receiving unit of low power consumption. In such structure, the receiving unit becomes sensitive to external noises, as the output of the transmitted signal is low. In addition, erroneous signals are likely to be generated due to mechanical or physical vibration and shock during traveling. For example, the speedometer is adapted to calculate the speed of travel of a bicycle, such that the rotary signal is outputted as one pulse signal per one rotation of the wheel of the bicycle, the number of generation of the pulse signals are counted, and the speed of travel of the bicycle is calculated based on the counted value. When vibration or shock generating signals similar to the pulse signals are applied to the receiving unit or the transmitting unit, the pseudo signals may be counted as proper pulse signals. As a result, the speed of the bicycle cannot be accurately counted or displayed.

The foregoing is a problem not only of the speedometer for bicycles, but it is common to all wireless transmitting/receiving apparatuses used under similar conditions.

SUMMARY OF THE INVENTION

An object of the present invention is to improve the reliability of a wireless transmitting-receiving apparatus.

Another object of the present invention is to ensure transmission of signals in a wireless transmitting-receiving apparatus.

A further object of the present invention is to prevent pseudo erroneous signals from obstructing transmission of proper signals in a wireless transmitting-receiving apparatus.

A still further object of the present invention is to improve reliability in detecting speed in a wireless transmitting-receiving apparatus for two-wheeled vehicles.

The above described objects of the present invention can be attained by a wireless transmitting-receiving apparatus of the present invention comprising, in one aspect, signal generating means for successively generating a plurality of signals; first signal converting means for converting each of the generated signals into at least two continuous signals; wireless transmitting means for transmitting, in wireless manner, the converted signals; signal receiving means for successively receiving the transmitted signals; and second signal converting means for converting the received signals into signals corresponding to the signals generated by the signal generating means in accordance with the manner of conversion of the first signal converting means.

The above-described object of the present invention can be attained, in another aspect, by a wireless transmitting-receiving apparatus which is an apparatus for detecting and displaying the speed of travel of a two-wheeled vehicle, attached on a wheel, comprising first signal generating means for generating one signal per one rotation of the wheel; first signal receiving means for successively receiving the generating at least two pulse signals per every signal received by the first signal receiving means with a prescribed or predetermined pulse interval; wireless transmitting means for successively transmitting, in wireless manner, the generated pulse signals; second signal receiving means for successively receiving the transmitted pulse signals; and converting means for converting the receiving pulse signals into signals corresponding to the signals received by the first signal receiving means in accordance with the prescribed or predetermined pulse interval.

The wireless transmitting-receiving apparatus structured as described above transmits a signal by converting the same into a plurality of signals, so that the signal can be received without any influence of other signals, whereby the reliability in the transmitting-receiving operation can be improved.

The foregoing and other objects, features, aspects and advantages of the present invention will become more apparent from the following detailed description of the present invention when taken in conjunction with the accompanying drawings.

BRIEF DESCRIPTION OF THE DRAWINGS

There is shown in the attached drawing a presently preferred embodiment of the present invention wherein.

DESCRIPTION OF THE PREFERRED EMBODIMENTS

Figure 4:
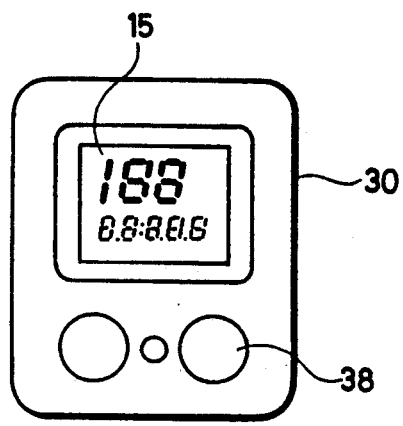
FIG. 4 is a plan view of the transmitting-receiving apparatus shown in FIG. 2.

Referring to FIGS. 1A, 1B, 2, 3 and 5, a signal generating portion 20 and a transmitting portion 22 comprise a transmitting apparatus 28 detachably mounted on a fork 34 for the front wheel of the bicycle 24. A magnet 26 is detachably mounted on spoke 32 of the front wheel. The magnet 26 is attached at a position spaced apart from the axis 36 by a distance corresponding to the distance between the axis 36 of the front wheel and the transmitting apparatus 28. The magnet 26 and the transmitting apparatus 28 are effectively each spaced radially outward the same distance from the axis 36 of the front wheel. By this structure, a contact of a reed switch (not shown) incorporated in the transmitting apparatus 28 is closed to generate one signal every time the magnet 26 passes the transmitting apparatus 28. The generated signal is outputted as a wireless signal through the transmitting portion 22 of the transmitting apparatus 28 to be received by a receiving apparatus 30 mounted on a stem 19 of the bicycle 24. Receiving apparatus 30 may be mounted on the stem 19 of the handlebar which is secured to the stem. The receiving apparatus 30 comprises a receiving portion 8 receiving the transmitted signal, a microcomputer 14 for carrying various arithmetic operations such as calculation of the speed of travel, distance of travel and so on based on the receiving signal, and a displaying portion 15 formed of, for example, a liquid crystal for displaying the result of other arithmetic operation as desired. A switch 38 (FIG. 4) is provided in the receiving apparatus 30 for switching display of the results of arithmetic operations as needed.

Figure 1A:
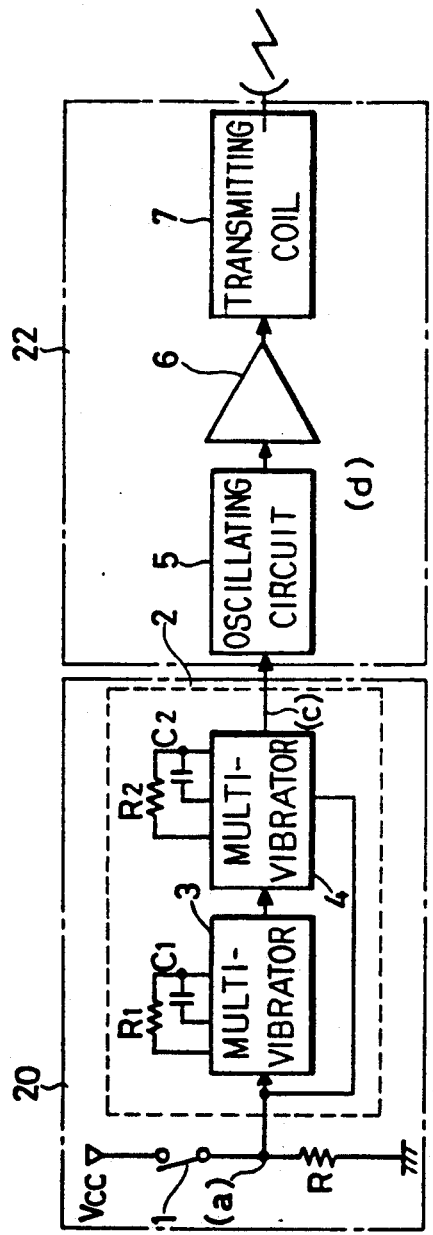
FIGS. 1A and 1B show schematically the receiving apparatus and the transmitting apparatus of the transmitting-receiving apparatus in accordance with one embodiment of the present invention.
Figure 5:
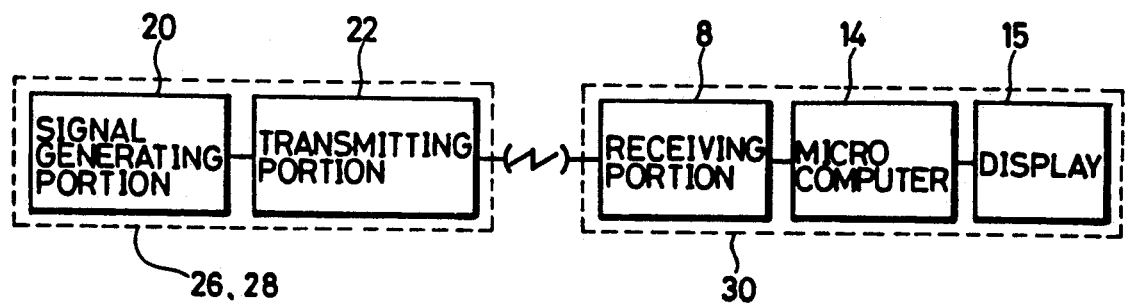
FIG. 5 is a block diagram of the transmitting-receiving apparatus in FIG. 1.

The structure will be described in the following with reference to the FIGS. 1A, 1B and 5.

A reed switch 1 and a resistance R are connected in series between the ground potential and a power supply potential $V_{cc}$ provided by a battery (not shown) incorporated in the transmitting apparatus. A one shot multivibrator 3 and a one shot multivibrator 4 are connected in series between node or joint (a) which is located between the reed switch 1 and the resistance R, and node or line (c), and further, the node or joint (a) is directly connected to the multivibrator 4, whereby a double pulse generating portion 2 is formed. The pulse width of the pulses generated by the multivibrator 3 is determined by the resistance $R_1$ and a capacitance $C_1$ defining a time constant. Similarly, the pulse width of the pulses generated by the multivibrator 4 is determined by the resistance $R_2$ and the capacitance $C_2$ defining a time constant. A signal generating portion 20 is formed in this manner.

The transmitting portion 22 comprises an oscillating circuit 5 to which the output of the multivibrator 4 is connected, an amplifier 6 amplifying the signals from the oscillating circuit 5, and a transmitting coil 7 for transmitting the amplified signals. In the receiving portion 8, an amplifier 10 is connected to a receiving coil 9 receiving the transmitted signals, and multivibrators 11 and 12 are connected in series between the amplifier 10 and an AND gate 13. The output from the amplifier 10 is also connected directly to an input of the AND gate 13. The pulse width on the pulses generated from the multivibrator 11 is determined by the resistance $R_3$ and the capacitance $C_3$ defining a time constant. The pulse width of the pulses generated from the multivibrator 12 is determined by the resistance $R_4$ and the capacitance $C_4$ defining a time constant. The output of the AND gate 13 is connected to a microcomputer 14. The displaying portion 15 is also connected to the microcomputer 14.

The operation of the transmitting-receiving apparatus in accordance with one embodiment of the present invention will be described in the following with reference to these figures and to the waveform diagrams of FIGS. 6–13. FIGS. 6–13 represent waveforms which show the voltage waveforms at, respectively, the nodes (joint or lines) (a)-(h), which are shown in FIGS. 1A and 1B.

Figure 6:
FIG. 6 shows the voltage waveform at Point (a) shown in FIG. 1A.
Figure 7:
FIG. 7 shows the voltage waveform at Point (b) shown in FIG. 1A.
Figure 8:
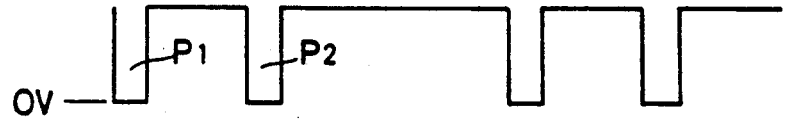
FIG. 8 shows the voltage waveform at Point (c) shown in FIG. 1A.

When the front wheel of the bicycle is rotated and the magnet 26 passes in front of the reed switch 1 in the transmitting apparatus 28, the contact of the switch 1 is closed, whereby a current is generated between the power supply potential $V_{cc}$ and the ground potential, and a pulse voltage is generated at the node or joint shown in FIG. 6 (see the waveform (a)). A first voltage is inputted to the one shot multivibrators 3 and 4. By the voltage input, the one shot multivibrator 3 generates pulses having the pulse width $R_1C_1$, defining the pulse interval between two pulses (hereinafter referred to as double pulses) generated for one pulse voltage (see the waveform shown in FIG. 7). The one shot multivibrator 4 generates a first pulse P1 having the width $R_2C_2$. When the time $R_1C_1$ is passed from the generation of the first pulse P1 and the pulse output from the multivibrator 3 falls, the multivibrator 4 generates, in response thereto, a second pulse P2 having the same pulse width as the first pulse P1 (see the waveform shown in FIG. 8). In this manner, the first pulse P1 and the second pulse P2 constitute the double pulse.

Figure 9:
FIG. 9 shows the voltage waveform at Point (d) shown in FIG. 1A.
Figure 10:
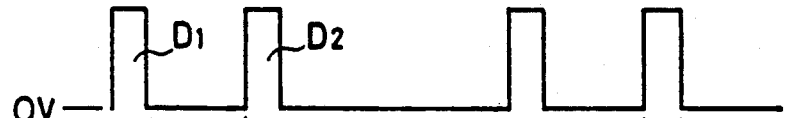
FIG. 10 shows the voltage waveform at Point (e) shown in FIG. 1B.
Figure 11:
FIG. 11 shows the voltage waveform at Point (f) shown in FIG. 1B.
Figure 12:
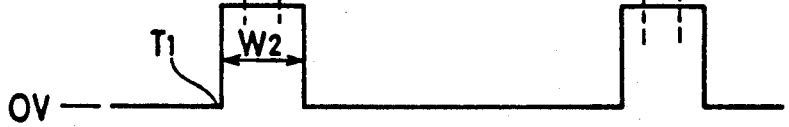
FIG. 12 shows the voltage waveform at Point (g) shown in FIG. 1B.

Every time the double pulse is inputted to the oscillating circuit 5 of the transmitting portion 22, the oscillating circuit 5 outputs an oscillating waveform (see the waveform shown in FIG. 9). It is amplified by the amplifier 6 and controls the current flowing through the transmitting coil 7 to transmit radio wave.

Figure 1B:
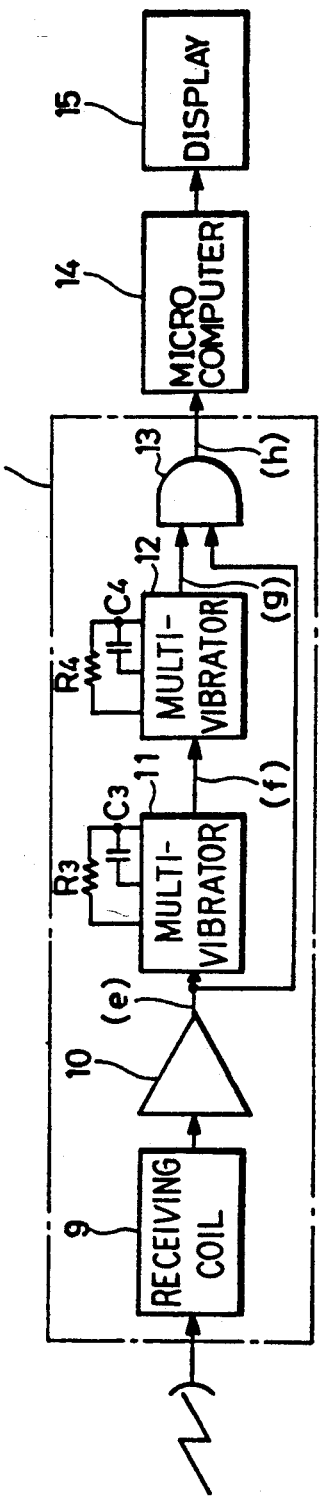
Figure 2:
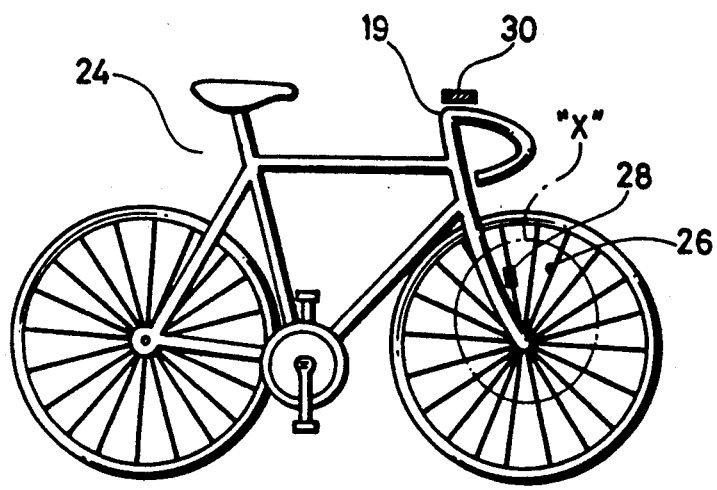
FIG. 2 is a schematic view of a bicycle having a speedometer incorporating the transmitting-receiving apparatus of FIGS. 1A and 1B.
Figure 3:
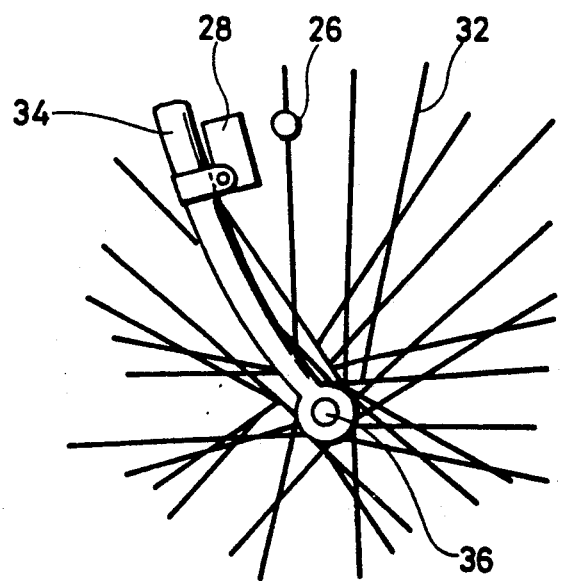
FIG. 3 is an enlarged view of the portion "X" of FIG. 2.

The radio wave corresponding to the double pulse based on the rotation signal transmitted in this manner is detected as a voltage change by a receiving coil 9 of the receiving portion 8 shown in FIG. 1B. The detected voltage change is amplified by the amplifier 10 and is outputted as a double pulse corresponding to the double pulse in the signal generating portion 20 (see the waveform shown in FIG. 10). The first pulse D1 constituting the double pulse is inputted to the one shot multivibrator 11 and to one input of the AND gate 13. However, since no signal is inputted to the other input portion of the AND gate 13, no signal is outputted from the output portion of the gate. The multivibrator 11 receiving the first pulse D1 generates a pulse having the pulse width W1 determined by the time constant $R_3C_3$ (see the waveform shown in FIG. 11). At the fall of this pulse, the multivibrator 12 generates a pulse having the pulse width W2 determined by the time constant $R_4C_4$ (see the waveform shown in FIG. 12). The pulse width W1 and W2 are defined such that the second pulse D2 is included in the timing of generating of the pulse having the pulse width W2 generated from the multivibrator 12.

Figure 13:
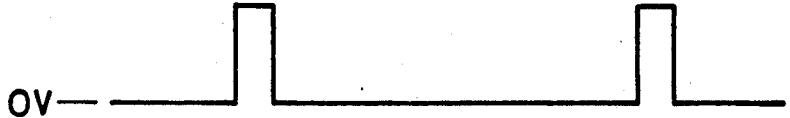
FIG. 13 shows the voltage waveform at Point (h) shown in FIG. 1B.

When the timing $T_1$ of operation of the one shot multivibrator 12 of the receiving portion 8 and the pulse width W2 are set as described above, one pulse is outputted from the AND gate 13 when the second pulse D2 of the transmitted double pulse is received (see the waveform shown in FIG. 13). This pulse is a third pulse treated at a rotation signal corresponding to the aforementioned pulse voltage. Namely, the number of pulse generation in a prescribed or predetermined period of the pulse voltages indicating the number of rotation of the front wheel of a bicycle is the same as that of the third pulse. Therefore, by inputting the third pulses to a one chip microcomputer 14 used for a conventional speedometer and by counting the number of generations of the third pulses, the speed of travel of the bicycle can be calculated. The result of calculation is displayed on the displaying portion 15 as needed, and by accumulating the travel speed, the travel distance can be calculated and displayed in the displaying portion 15.

Now, when the multivibrators 11 and 12 of the receiving portion 8 are in operation, the multivibrator 11 is adapted to be not responsive to an input. When the output of the multivibrator 12 is at the "high level" and a noise is generated from the amplifier 10 near the generation timing of the second pulse, a signal may be outputted from the AND gate 13, causing a miscount.

Figure 14:
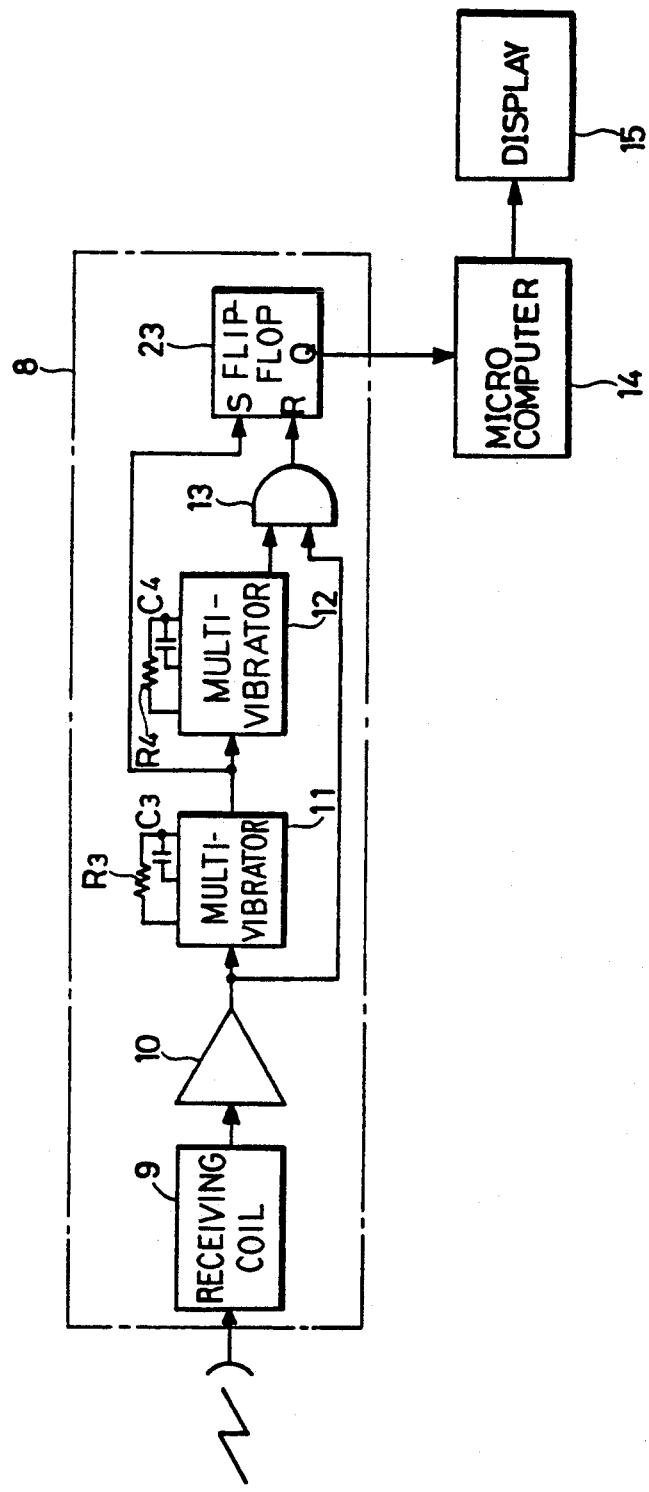
FIG. 14 shows schematically another emboidment of the apparatus in the transmitting-receiving apparatus.

Another embodiment of the present invention shown in FIG. 14 is a receiving apparatus for preventing such miscount.

This embodiment differs from the first embodiment shown in FIG. 1B in that a flipflop circuit 23 is added in the receiving portion 8. The transmitting apparatus may be the same as that shown in the first embodiment of FIG. 1A. The flipflop circuit 23 has its set input S and a reset input R connected to the output of the one shot multivibrator 11 and to the output of the AND gate 13, respectively. The output Q of the flipflop circuit 23 is connected to the one chip microcomputer 14 of the speedometer. By this structure, the output of the flipflop circuit 23 can be permitted provided that there is an output from the multivibrator 11. Namely, even when the output of the multivibrator 12 is at the "high level" and a plurality of noises near the second pulse are received by the AND gate 13, there is no miscounting. Therefore, highly reliable data of speed detection can be inputted.

Although the present invention is applied to a speedometer for a bicycle in the foregoing description, the application of the spirit of this invention is not limited thereto. For example, it can be applied to any apparatuses such as a wireless sphygmometer for exercise indoor and outdoor, or an apparatus for detecting rotation speed of an indoor exercise bicycle and any apparatus which is wireless, in which signal transmission and reception are required with low power consumption are required and which is susceptible to external noises.

Although double pulses are generated and transmission/reception are carried out based on these pulses in the foregoing, three or more pulses may be used, provided that the pulses are generated with prescribed pulse intervals. In that case, these pulses as a whole define one pulse, so that the reliability can be further improved in the trasmitting-receiving apparatus.

In the present invention, two or more pulse signals having prescribed pulse intervals are generated based on one input signal, and the pulse signals are transmitted and received, as described above. Therefore, even if other pulse signals are happened to be mixed because of noise and the like, such signals are not erroneously counted, whereby the reliability of the transmitting-receiving apparatus can be improved.

Although the present invention has been described and illustrated in detail, it is clearly understood that the same is by way of illustration and example only and is not to be taken by way of limitation, the spirit and scope of the present invention being limited only by the terms of the appended claims.

I claim:

1. A wireless transmitting-receiving apparatus comprising:
   signal generating means for successively generating a plurality of signals;
   first signal converting means for converting each of said generated signals into at least two continuous signals;
   wireless transmitting means for transmitting said converted signals in a wireless manner;
   signal receiving means for successively receiving said transmitted signals; and
   second signal converting means for converting said received signals into signals corresponding to the signals generated by said signal generating means in accordance with the manner of conversion of said first signal converting means, said second signal converting means including two one shot multivibrators.

2. A transmitting-receiving apparatus according to claim 1, wherein
   said first signal converting means generates two pulse signals having a predetermined pulse interval for every one of said generated signals.

3. A wireless transmitting-receiving apparatus, comprising:
   first signal generating means for successively generating a plurality of signals;
   second signal generating means for generating at least two pulse signals having a predetermined pulse interval for each of the signals generated by said first signal generating means;
   wireless trasmitting means for continuously transmitting said generated pulse signals in a wireless manner;
   receiving means for successively receiving said transmitted pulse signals; and
   converting means for converting said received pulse signals into signals corresponding to the signals generated by said first signal generating means in accordance with said predetermined pulse signals, said converting means including two one shot multivibrators.

4. A transmitting-receiving apparatus according to claim 3, wherein
   said converting means further comprises an AND gate and a flipflop circuit.

5. A transmitting-receiving apparatus according to claim 4, wherein
   said AND gate has an input and an output, said converting means comprises first and second one shot multivibrators, each of said one shot multivibrators having an input and a output, said output of said first one shot multivibrator being interconnected to said input of said second one shot multivibrator, said input of said first one shot multivibrator and said output of said second one shot multivibrator being interconnected to said AND gate, and said output from said first one shot multivibrator and said output from said AND gate are inputted to said flipflop circuit.

6. A wireless transmitting-receiving apparatus for detecting and displaying the speed of travel of a wheeled vehicle, comprising:
    first signal generating means attached to a wheel for generating one signal per every rotation of said wheel;
    first signal receiving means for successively receiving said generated signals;
    second signal generating means, interconnected to said first signal receiving means, for generating at least two pulse signals with a predetermined pulse interval for every signal received by said first signal receiving means;
    wireless transmitting means for continuously transmitting said generated pulse signals in a wireless manner;
    second signal receiving means for successively receiving said transmitted pulse signal;
    converting means for converting said received pulse signals into signals corresponding to the signals received by said first signal receiving means, in accordance with said predetermined pulse interval, said converting means including two one shot multivibrators;
    calculating means for calculating the speed of travel of the wheeled vehicle by counting said converted signals; and
    displaying means for displaying said calculated speed of travel.

7. A transmitting-receiving apparatus according to claim 6, wherein
    said first signal generating means comprises a magnet attached on a spoke of the two-wheeled vehicle and a reed switch and a resistance attached on a fork of the vehicle, said read switch turned ON every time said magnet passes in front of said read switch to generate one signal.

8. A transmitting-receiving apparatus according to claim 7, wherein
    said wheeled vehicle is a bicycle having a frame with a fork and said first signal generating means is attached to a spoke of the front wheel and said fork.

9. A transmitting-receiving apparatus comprising:
    first signal generating means for successively generating a plurality of signals;
    second signal generating means for generating at least two pulse signals having a predetermined pulse interval for each of the signals generated by said first signal generating means, said second signal generating means including two one shot multivibrators;
    wireless transmitting means for continuously transmitting said generated pulse signals in a wireless manner;
    receiving means for successively receiving said transmitted pulse signals; and
    converting means for converting said received pulse signals into signals corresponding to the signals generated by said first signal generating means in accordance with said predetermined pulse signals, said converting means including two one shot multivibrators and an AND gate.

10. A transmitting-receiving apparatus according to claim 9 wherein said converting means comprises first and second one shot multivibrators, each of said one shot multivibrators having an input and an output, said output of said first one shot multivibrator being interconnected to said input of said second one shot multivibrator and said output of said second one shot multivibrator being interconnected to said AND gate.

* * * * *